US007699732B2

(12) United States Patent
Message et al.

(10) Patent No.: US 7,699,732 B2
(45) Date of Patent: Apr. 20, 2010

(54) INSTRUMENTED TAKE-UP UNIT AND RELATED CONTROL METHOD

(75) Inventors: Olivier Message, Tours (FR); Frédéric Ponson, Luynes (FR)

(73) Assignee: Aktiebolaget SKF, Göteborg (SE)

( * ) Notice: Subject to any disclaimer, the term of this patent is extended or adjusted under 35 U.S.C. 154(b) by 1147 days.

(21) Appl. No.: 10/495,496

(22) PCT Filed: Nov. 12, 2002

(86) PCT No.: PCT/FR02/03867

§ 371 (c)(1),
(2), (4) Date: Nov. 30, 2004

(87) PCT Pub. No.: WO03/042577

PCT Pub. Date: May 22, 2003

(65) Prior Publication Data

US 2005/0124447 A1    Jun. 9, 2005

(30) Foreign Application Priority Data

Nov. 13, 2001   (FR)   .................... 01 14669

(51) Int. Cl.
*F16H 7/12* (2006.01)
*F16H 7/10* (2006.01)
(52) U.S. Cl. .................. 474/135; 474/106; 474/112
(58) Field of Classification Search .......... 474/133, 474/138, 102–106, 135, 109, 112; 73/865.9, 73/514.26, 862.453, 862.46; 250/231.14; 324/207.25
See application file for complete search history.

(56) References Cited

U.S. PATENT DOCUMENTS

| 4,029,186 | A | 6/1977  | De Gennes       |
| 4,046,238 | A | 9/1977  | Mendoza-Orozco  |
| 4,319,220 | A | 3/1982  | Pappas et al.   |
| 4,478,595 | A | 10/1984 | Hayakawa et al. |
| 4,601,374 | A | 7/1986  | Ladin           |
| 4,608,741 | A | 9/1986  | Mallet          |

(Continued)

FOREIGN PATENT DOCUMENTS

DE    4228899    3/1994

(Continued)

OTHER PUBLICATIONS

Patent Abstracts of Japan, vol. 12, No. 437 (M-765), Nov. 17, 1988, 1 page. (Translated abstract of JP 63-172052).
Patent Abstracts of Japan, vol. 12, No. 160 (M-697), May 14, 1988, 1 page. (Translated abstract of JP 62-278352).
Preliminary Search Report for FR 0114669, FA 610794, Sep. 2, 2002, 3 pages.

(Continued)

*Primary Examiner*—Bradley T King
*Assistant Examiner*—Thomas Irvin
(74) *Attorney, Agent, or Firm*—Meyertons, Hood, Kivlin, Kowert & Goetzel, P.C.; Eric B. Meyertons (57) ABSTRACT

The invention concerns a device for tensioning belts or chains that may include a fixed support; a moving element that may move relative to the fixed support and designed to be in contact with the belt or the chain; and an actuator designed to exert a permanent tensioning force between the mobile equipment and the fixed support. The device may also include a sensor unit to monitor parameters of angular displacement of the moving element relative to the fixed support.

7 Claims, 5 Drawing Sheets

U.S. PATENT DOCUMENTS

| | | | |
|---|---|---|---|
| 4,641,523 A | 2/1987 | Andreasson | |
| 4,699,530 A | 10/1987 | Satoh et al. | |
| 4,721,495 A * | 1/1988 | Kan et al. | 474/135 |
| 4,815,867 A | 3/1989 | Ladin | |
| 4,854,436 A | 8/1989 | Lassiaz et al. | |
| 4,872,768 A | 10/1989 | Brandenstein et al. | |
| 4,874,073 A | 10/1989 | Tagawa | |
| 4,881,629 A | 11/1989 | Gay et al. | |
| 4,946,295 A | 8/1990 | Hajzler | |
| 4,957,133 A | 9/1990 | Linz et al. | |
| 5,008,647 A | 4/1991 | Brunt et al. | |
| 5,018,384 A | 5/1991 | Hayashi et al. | |
| 5,033,013 A | 7/1991 | Kato et al. | |
| 5,264,790 A | 11/1993 | Moretti et al. | |
| 5,372,435 A | 12/1994 | Genero et al. | |
| 5,575,568 A | 11/1996 | Rigaux et al. | |
| 5,592,401 A | 1/1997 | Kramer | |
| 5,598,913 A | 2/1997 | Monahan et al. | |
| 5,713,577 A | 2/1998 | Lannert et al. | |
| 5,721,539 A | 2/1998 | Goetzl | |
| 5,780,731 A | 7/1998 | Matsui et al. | |
| 5,845,230 A | 12/1998 | Lamberson | |
| 5,865,288 A | 2/1999 | Thomire et al. | |
| 5,877,431 A | 3/1999 | Hirano | |
| 6,011,491 A | 1/2000 | Goetzl | |
| 6,013,007 A | 1/2000 | Root et al. | |
| 6,035,990 A | 3/2000 | Peschke | |
| 6,043,643 A | 3/2000 | Message et al. | |
| 6,056,446 A | 5/2000 | Welter et al. | |
| 6,109,624 A | 8/2000 | Message et al. | |
| 6,149,542 A * | 11/2000 | Lehtovaara | 474/112 |
| 6,160,480 A | 12/2000 | Su-yueh | |
| 6,196,552 B1 | 3/2001 | Peterson et al. | |
| 6,267,512 B1 | 7/2001 | Beghini et al. | |
| 6,323,640 B1 | 11/2001 | Forestiero et al. | |
| 6,338,576 B1 | 1/2002 | Girardin et al. | |
| 6,364,795 B1 * | 4/2002 | Komorowski et al. | 474/42 |
| 6,375,588 B1 * | 4/2002 | Frankowski et al. | 474/112 |
| 6,415,900 B1 | 7/2002 | Lopez et al. | |
| 6,539,336 B1 | 3/2003 | Vock et al. | |
| 6,611,138 B2 | 8/2003 | Vasiloiu | |
| 6,612,749 B2 | 9/2003 | Arnault et al. | |
| 6,666,784 B1 | 12/2003 | Iwamoto et al. | |
| 6,908,229 B2 | 6/2005 | Landrieve et al. | |
| 2002/0177499 A1 * | 11/2002 | Ayukawa et al. | 474/135 |
| 2003/0000276 A1 | 1/2003 | Pflunger et al. | |
| 2003/0007631 A1 | 1/2003 | Bolognesi et al. | |
| 2003/0083164 A1 * | 5/2003 | MacNaughton et al. | 474/135 |
| 2004/0013334 A1 | 1/2004 | Landrieve et al. | |
| 2004/0141669 A1 | 7/2004 | Landrieve et al. | |
| 2004/0154895 A1 | 8/2004 | Thomire et al. | |
| 2004/0202392 A1 | 10/2004 | Niarfeix et al. | |
| 2005/0008276 A1 | 1/2005 | Beghini et al. | |
| 2005/0011717 A1 | 1/2005 | Arnault | |
| 2005/0011718 A1 | 1/2005 | Arnault | |
| 2005/0089255 A1 | 4/2005 | Debrailly et al. | |
| 2005/0124447 A1 | 6/2005 | Message et al. | |
| 2005/0165397 A1 | 7/2005 | Faus et al. | |
| 2005/0235513 A1 | 10/2005 | Niarfeix | |
| 2005/0265646 A1 | 12/2005 | Arnault | |
| 2006/0011445 A1 | 1/2006 | Bussit et al. | |
| 2008/0058143 A1 * | 3/2008 | Fukuda | 474/138 |
| 2008/0287233 A1 * | 11/2008 | Cantatore | 474/112 |

FOREIGN PATENT DOCUMENTS

| | | |
|---|---|---|
| DE | 9418459 | 2/1995 |
| DE | 29708535 | 8/1997 |
| DE | 19637585 | 3/1998 |
| DE | 19809074 | 1/1999 |
| DE | 10049505 | 5/2001 |
| DE | 10011820 | 9/2001 |
| DE | 10042677 | 3/2002 |
| DE | 10148388 | 4/2003 |
| EP | 399855 | 11/1990 |
| EP | 0464404 | 1/1992 |
| EP | 0 511 105 | 10/1992 |
| EP | 511105 | 10/1992 |
| EP | 520853 | 12/1992 |
| EP | 806851 | 11/1997 |
| EP | 823267 | 2/1998 |
| EP | 930505 | 7/1999 |
| EP | 0 992 797 | 4/2000 |
| EP | 992797 | 4/2000 |
| EP | 1146244 | 10/2001 |
| EP | 1158287 | 11/2001 |
| FR | 2 375 484 | 12/1977 |
| FR | 2577291 | 8/1986 |
| FR | 2602872 | 2/1988 |
| FR | 2611244 | 8/1988 |
| FR | 2624577 | 6/1989 |
| FR | 2655735 | 6/1991 |
| FR | 2688560 | 9/1993 |
| FR | 2744506 | 8/1997 |
| FR | 2772444 | 6/1999 |
| FR | 2819864 | 7/2002 |
| GB | 1580301 | 12/1980 |
| GB | 2054084 | 2/1981 |
| GB | 2156082 | 10/1985 |
| GB | 2201745 | 9/1988 |
| JP | 62-278352 | 12/1987 |
| JP | 63-172052 | 7/1988 |
| WO | 9850709 | 11/1998 |
| WO | 0000756 | 1/2000 |
| WO | 02052280 | 7/2002 |
| WO | 2004005937 | 1/2004 |
| WO | WO 01/42809 | 1/2004 |

OTHER PUBLICATIONS

U.S. Appl. No. 10/520,384, filed Jan. 3, 2005, entitled "Instrumented Antifricition Bearing and Electrical Motor Equipped Therewith" to Gallion et al., available in Private PAIR.

U.S. Appl. No. 10/548,866, filed Sep. 9, 2005, entitled "Sensor Unit, and Housing Relay for the Production of Said Unit" to Landrieve, available in Private PAIR.

U.S. Appl. No. 10/551,167, filed Sep. 27, 2005, entitled "Portable Measuring Device for Use in Sport" to Franck, available in Private PAIR.

U.S. Appl. No. 10/552,375, filed Jan. 18, 2005, entitled "Freewheel Bearing Device and Freewheel Pulley" to Girardin, available in Private PAIR.

U.S. Appl. No. 10/562,476, filed Dec. 21, 2005, entitled "Bearing Support with an Instrumented Movement and Coder for an Information Recorder Unit" to Gallion et al., available in Private PAIR.

English translation of DE 10011820 (1 page).
English translation of DE 10042677 (1 page).
English translation of DE 10148388 (1 page).
English translation of DE 19637585 (1 page).
English translation of DE 29708535 (1 page).
English translation of EP 399855 (1 page).
English translation of EP 511105 (1 page).
English translation of EP 520853 (1 page).
English translation of EP 823267 (1 page).
English translation of FR 2577291 (1 page).
English translation of FR 2602872 (1 page).
English translation of FR 2611244 (1 page).
English translation of FR 2655735 (1 page).
English translation of FR 2688560 (1 page).
English translation of FR 2772444 (1 page).
English translation of FR 2819864 (1 page).

* cited by examiner

INSTRUMENTED TAKE-UP UNIT AND RELATED CONTROL METHOD

BACKGROUND OF THE INVENTION

1. Field of the Invention

The present invention generally relates to a belt-tensioning or a chain-tensioning device designed to ensure a suitable tension of a belt or chain. In particular, embodiments relate to systems and methods for ensuring a suitable tension of a belt or chain in a tension device in an automotive vehicle.

2. Brief Description of the Related Art

A tensioning device generally comprises a fixed bracket and a moving part, in the form of a cam or a swivel arm, mounted with rotational capability on the fixed bracket. A pulley is mounted in idle arrangement on the moving part by means of a rolling bearing and is intended to be brought into contact with the belt. A spring exerts a tension force between the bracket and the moving part, causing the pulley to make contact with the belt with a suitable belt tension. The moving part is mounted with adjustment capability on the bracket so as to be able to adjust the tension force of the belt, as described in FR 2 624 577 and FR 2 744 506, which describe tensioning devices.

A belt-tensioning device has to be adjusted in order to maintain the tension of the belt within a certain tolerance range. Wear of the belt or the dimensional variations of the belt caused, for example, by temperature variations, may also require device adjustments to maintain tension. The tension applied in the belt by the tensioning device is adjusted in an assembly stage with the aid of visual reference marks. The tension of the belt is checked in the course of maintenance operations.

The failure of a belt or of a tensioning device, can cause a stoppage or failure of a mechanical device connected to the belt and can impair the operating reliability of a mechanical device. A failure of a timing belt of a heat engine of an automotive vehicle can instantaneously cause serious damage to said engine.

Tensioning devices of the type described above do not prevent failure of the belt or of the tensioning device. The imminence of a belt or tensioning device failure is difficult to predict and can happen suddenly and unexpectedly.

SUMMARY OF THE INVENTION

In some embodiments, the system may include a belt-tensioning or chain-tensioning device by which the belt or chain tension may be easily and rapidly adjusted. The system may also include a belt-tensioning or a chain-tensioning device that may constantly monitor the tension of the belt, the wear of the belt and the correct functioning of the tensioning device. In certain embodiments, a belt failure or a failure of the belt-tensioning or chain-tensioning device may be anticipated.

In one embodiment, a belt- or a chain-tensioning device may include a fixed bracket, a moving element, and/or an actuator. A moving element may move relative to the fixed bracket. A moving element may be in contact with the belt or the chain. An actuator may exert a permanent tension force between the moving element and the fixed bracket. The device may additionally include a sensor unit. A sensor unit may monitor movement parameters of the moving element relative to the fixed bracket.

During use, movement parameters of the moving element relative to the fixed bracket may have characteristics of movement, variation of movement, frequency and amplitude of oscillation. These characteristics of the movement parameters are linked to the tensioning device and to the belt or the chain. By analyzing the movement parameters, it may be possible to detect the appearance of signals which are characteristic of faults or wear in the tensioning device and in the belt or chain. From the detected signal, the origin of this signal may be precisely determined.

The sensor unit for the movement parameters of the moving element relative to the fixed bracket may be a sensor unit for angular displacement parameters. In an embodiment, the moving element may be rotation-mounted relative to the fixed bracket. An actuator may be arranged to exert a moment between the moving element and the fixed bracket.

In one embodiment, the tensioning device includes a coder element positioned on a working cam of a tensioning roller or on a pivot bearing for an arm. The coder element may be able to rotate past a sensor coupled to the fixed bracket.

In one embodiment, the moving element includes a pulley mounted in idle arrangement on the moving element. It may be desirable for the pulley to come into contact with the belt or the chain.

In some embodiments, the tension of a belt or chain may be monitored. A tension force may be exerted between a fixed bracket and a moving element relative to the fixed bracket. A moving element may be in contact with the belt or the chain. Parameters of angular displacement of the moving element relative to the fixed bracket may be measured. In one embodiment, an angular displacement, an angular displacement velocity, a frequency and/or an amplitude of angular displacement of the moving element rotation-mounted relative to the fixed bracket may be measured.

A record of failure of the belt or of the tension device may be a function of mean angular displacement thresholds. The threshold values of mean angular displacement may be values for which it is known to be worth proceeding to examine the tensioning device, the belt or the chain. Several thresholds may be used. In an embodiment, one threshold may be an alarm threshold for conducting a maintenance operation and one threshold may be a danger threshold by which a tear which is damageable by a stoppage of the mechanical unit using the belt may be anticipated.

A record of failure of the belt or of the tension device may be a function of the frequency or amplitude of oscillation about a mean angular displacement value. By examining the frequency of the amplitude of oscillation of measuring signals for angular displacement, it may be possible to detect and characterize faults which might lead to a failure of the belt or of a tensioning device. A record of failure may be a function of thresholds of amplitude of oscillation or of frequency of oscillation about a mean angular displacement value.

In some embodiments, the system may include a microprocessor with a CPU and a memory. A memory may be coupled to the CPU. A memory may include executable program instructions, such as a computer program. A computer program include modules for implementing a process for monitoring the tension of a belt tensioned by means of a tensioning device. The tensioning device may include a fixed bracket, a moving element relative to the fixed bracket, and an actuator that may exert a permanent tension force between the moving element and the fixed bracket. The computer program may include a module for receiving signals corresponding to parameters of angular displacement of the moving element relative to the fixed bracket, and a module for processing received signals. The module for processing received signals may furnishing a belt-tension record or a failure record on the basis of a movement value, a movement velocity value, and a frequency and amplitude of oscillation value.

BRIEF DESCRIPTION OF THE DRAWINGS

Features and advantages of the methods and apparatus of the present invention will be more fully appreciated by reference to the following detailed description of presently preferred but nonetheless illustrative embodiments in accordance with the present invention when taken in conjunction with the accompanying drawings in which.

DETAILED DESCRIPTION OF EMBODIMENTS

Figure 1:
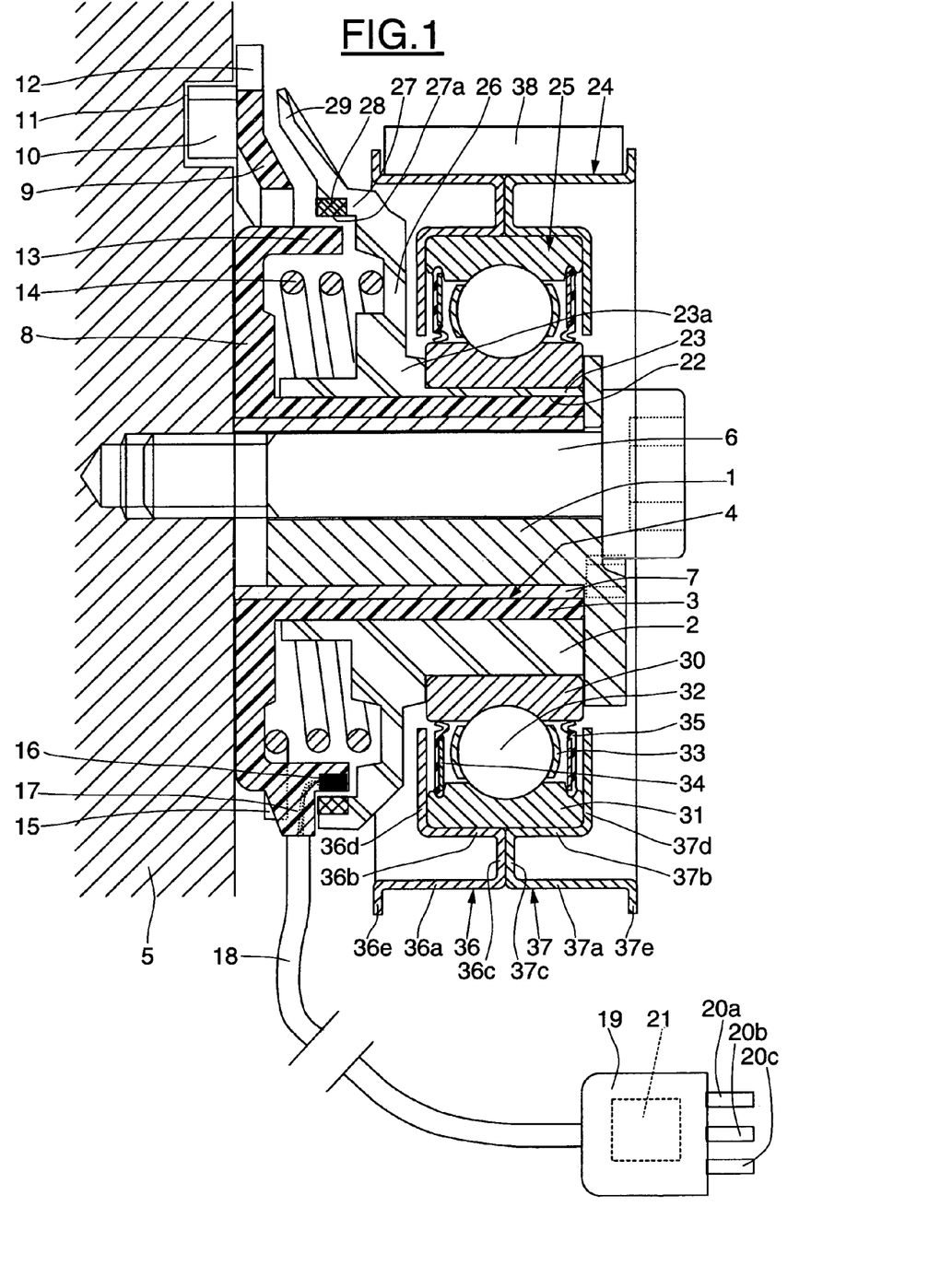
FIG. 1 illustrates a cross-sectional view of an embodiment of a tensioning device.

An embodiment of a tensioning device is depicted in FIG. 1. A tensioning device may include an adjusting cam 1 and a moving element. The moving element may include a working cam 2 mounted with rotational capability on the adjusting cam 1 by a tubular bushing 3 of a fixed bracket 4. The tubular bushing 3 forms a plain bearing.

An adjusting cam 1 may be fixed on a block 5 by means of a screw 6. The adjusting cam 1 may pivot relative to the block 5 when the screw 6 is loosened. Fastening the screw 6 may immobilize the cam 1.

The bracket 4 may include a cylindrical metal insert 7 positioned between the cam 1 and the tubular bushing 3. The metal insert 7 and the tubular bushing 3 are joined together by any appropriate means including, but not limited to, molding the tubular bushing 3 by casting the tubular bushing on the metal insert 7. The bracket 4 may include a plate forming a substantially flat base 8. The plate may attach perpendicularly to the tubular bushing 3 and bear upon the block 5 by means of the metal insert 7. The base 8 may include a radially projecting tongue 9. A blocking pin 10 may project, from a free end of the tongue 9, axially into a corresponding opening 11 in the block 5. The tongue 9 also may include at its free end a reference notch 12.

The bracket 4 may include a tubular axial portion 13 extending from a zone of greater diameter of the base 8. The tubular axial portion 13 may surround the tubular bushing 3.

A sensor 16 may be positioned in the free end of the tubular axial portion 13. The sensor 16 may be flush with the outer surface of tubular axial portion 13. A connecting portion 17, situated proximate to the sensor 16, may extend in radial projection from the axial portion 13. The connecting portion 17 may include linking means, diagrammatized by dotted lines, between the sensor 16 and a wire link 18 leaving the connecting portion 17. The free end of the wire link 18 may include a connecting plug 19 with three pins 20a, 20b, 20c. The plug 19 may include a processing unit 21 represented by dotted lines.

The working cam 2 may include a bore 22 mounted such that the bore slides rotationally on the tubular bushing 3 of the bracket 4. The working cam 2 may include, at an end opposite to the base plate 8 of the bracket 4, a cylindrical outer surface 23 of revolution about a different axis than the main axis of the bushing 3. A pulley 24 may be rotation-mounted on the cylindrical surface 23 of the working cam 2 by means of a rolling bearing 25.

The cylindrical surface 23 may be limited axially by a shoulder 23a serving as an axial support for the rolling bearing 25. A radial wall 26 may extend radially outward, may be adjacent to the shoulder 23a, and may be situated at a distance from the end of the working cam 2 on the side of the base plate 8. The free edge of the radial wall 26 may be positioned axially proximate to the free end of the axial wall 13 of the bracket 4.

A tubular skirt 27 may extend axially from the zone of greater diameter of the radial wall 26 and may radially surround the free end of the axial portion 13. The tubular skirt 27 may include a coder ring 28. The coder ring 28 may lay flush with the inner surface 27a of the tubular skirt 27. The coder ring 28 may face the sensor 16 positioned in the cylindrical axial portion 13. A projection 29 extend radially from the outer surface of the skirt 27 to serve as a visual reference mark corresponding to the notch 12 in the tongue 9.

The coder ring 28 may be an optical-type coder ring. The coder ring 28 may include, but is not limited to, an alternation of opaque parts and reflective parts or a multipolar magnetic ring. The sensor 16 may be, but is not limited to, an optical sensor, a Hall-effect sensor, or a passive sensor in the form of a winding integrated in a flux concentrator cooperating by means of teeth with a multipolar magnetic ring.

The rolling bearing 25 may include an inner raceway 30, an outer raceway 31, rolling elements 32 disposed between the rolling tracks of the inner 30, and outer 31 raceways. The rolling bearing 25 may be kept circumferentially spaced by a cage 33. Sealing members 34, 35, situated on either side of the rolling elements 32, include a metal stiffening insert and a flexible part. The sealing members 34, 35 include a securing flange accommodated in a corresponding groove in a raceway and a lip that may contact a surface of the other raceway. By virtue of the sealing members 34, 35, the leak-tightness of the space contained radially between the inner 30 and outer 31 raceways and in which the rolling elements 32 are situated may be guaranteed.

The pulley 24 may include two half-pulleys 36, 37. Each pulley may include an outer cylindrical wall 36a, 37a intended to make contact with a belt (not represented in the figure) and an inner cylindrical wall 36b, 37b in contact with the outer surface of an outer raceway 28 of the rolling bearing 25. The outer 36a, 37a and inner 36b, 37b cylindrical walls are connected by portions of radial cores 36c, 37c. The half-pulleys 36, 37 are joined together, by mutual attachment of the radial cores 36c, 37c. The half-pulleys 36,37 may be joined by a pin or by weld points.

Each half-pulley 36, 37 includes a flank 36d, 37d extending radially inward from the free edge of the inner cylindrical portion 36b, 36c The flanks 36d, 37d mask sealing members 34, 35. The flanks 36d, 37d serve to hold the pulley 24 axially on the outer raceway 31 and to protect the sealing members 34, 35 from the splash of external elements. The half-pulleys 36, 37 may also include radial centering rims 36e, 37e that extend outward from the free edge of the outer cylindrical walls 36a, 37a. The radial centering rims 36e, 37e may guide a belt 38 in contact with the pulley 24.

A helical tension spring 14 is disposed between the base plate 8 and the radial wall 26. A helical tension spring surrounds the tubular bushing 3 and an end of the working cam 2 covering the tubular bushing 3. The helical tension spring 14 may be limited axially by the base 8 and the radial wall 26 and radially by the tubular bushing 3 and the axial wall 13. One end 15 of the helical tension spring 14 may be curved outward so as to couple with circumferential retaining means of the base 8. The other end of the spring 14 may similarly couple with the radial wall 26. The helical spring 14 exerts a torque between the bracket 4 and the working cam 2 rotation-mounted on the bracket.

In the assembly of the belt-tensioning device; a first stage includes adjusting the tension of the belt 38. In order to do this, the screw 6 is loosened such that the adjusting cam 1 is rotationally movable relative to the block 5 and the bracket 4. The adjusting cam 1 may be pivoted, by means of a control key, in the bracket 4, which is rotationally immobilized relative to the block 5 by pin 10. The pulley 24 is thus brought into contact with the belt 38. The adjusting cam 1 is further rotated, which, by reaction of the belt 38 on the pulley 24, induces the rotation of the working cam 2 relative to the bracket 4 with an increase in tension of the helical spring 14. Increasing the tension of the helical spring exerts a resistant torque between the bracket 4 and the working cam 2 and the torque may force the pulley 24 permanently back against the belt 38.

The device may be designed such that the pulley 24 exerts a force on the belt 38 and generates a suitable tension in said belt 38 when the projection 29 of the working cam 2 arrives opposite the notch 12 in the bracket 4. In this position, the screw 6 may be tightened such that the adjusting cam 1 is immobilized relative to the bracket 4 and relative to the block 5. The metal insert 7 may allow absorption of the axial tightening forces exerted by the screw 6.

The helical spring 14 exerts a torque corresponding to the angular displacement between the bracket 4 and the working cam 2. By virtue of this tension torque, a tension force of the belt in contact with the pulley 24 may be exerted.

The skirt 27 forms a narrow passage with the axial wall 13 in order to make the seat of the helical spring 14 leak-tight. Moreover, the formation of a narrow passage allows the space situated between the axial portion 13 and the skirt 27 to be protected from the intrusion of pollutant outer elements which might interfere with the measurements conducted by the sensor unit formed by the coder ring 38 and the sensor 16.

In some embodiments, the free end of the the axial portion 13 may include a plurality of sensors 16, circumferentially offset. Transmission of signals possessing a non-zero phase shift when the coder rotates past opposite said sensors may be possible by circumferentially offsetting the sensors.

In one embodiment, the bracket 4 may be made of synthetic material. The bracket 4 may be formed by molding or injecting a material. In an embodiment, a bracket may be made of dished plateand may be used without a metal insert 7.

In some embodiments, during operation, when the pulley 24 is rotationally driven by the belt, the sensor unit allows the recovery of signals corresponding to the rotation parameters of the working cam 2 relative to the bracket 4. Measurements of angular displacement, angular displacement velocity, frequency and amplitude of oscillation of the working cam 2 may be recovered. These signals possess components characteristic of the mechanical elements connecting to the working cam 2 (e.g., the spring 14, the rolling bearing 25, and the belt), as well as characteristics of distant elements in contact with the belt. Components characteristic of the meshing of the indexed belt with a toothed drive pulley may be retrieved. By analyzing the signals furnished by the sensor 16, a record of tension of the belt, a record of wear or failure of the belt, a record of temperature-linked dimensional variations of the belt, or a record of failure of the tensioning device or of a particular member may be determined.

The spring 14, by virtue of the torque which it exerts, maintain a permanent bearing force of the pulley 24 against the belt 38. A relationship exist between the tension variations of the belt, the wear of the belt and the slow mean angular displacements or the fast instantaneous angular displacements between the working cam 2 and the fixed bracket 4. A belt-tension record may be determined from the value of the mean angular displacement between the working cam 2 and the bracket 4. Mean angular displacement, in the context of this application, refers to a mean angular displacement over a short period of time, by which slow movements of the working cam 2 relative to the bracket 4 can be detected. Vibratory phenomena may be eliminated. The rapid and weak angular displacements of oscillation of the working cam 2 relative to the bracket 4 may be examined. The vibratory characteristics of the belt may vary according to the wear of the belt.

In an embodiment, where there is a risk of imminent failure of the belt, the vibratory characteristics of the belt may vary. If the critical vibratory characteristics of the belt are known, it may be possible to determine the corresponding critical characteristics of angular displacement of the working cam 2. For the working cam 2, thresholds of angular displacement, angular displacement velocity, frequency and amplitude of oscillation of angular displacement, which constitute alarm thresholds for wear of the belt or for failure of the tensioning device, may be determined.

Moreover, the measurements furnished by the sensor 16 in the assembly of the tensioning device may be used to adjust the tension of the belt or check the tension of the belt during the maintenance operation for the tensioning device. The presence of visual adjustment reference marks, notch 12 and projection 29 may not be necessary.

The plug 19 may include a processing unit 21. The processing unit 21 may pre-process the signals emanating from the sensor 16. The processing unit 21 may include a program stored in memory means. The program may be executable by a microprocessor. The program may include a receiving module for the measurements furnished by the sensor 16. The program may include a processing module for the received signals. The processing module may determine, in terms of output, a record of wear of the belt, failure of the belt or failure of the tensioning device. These records may be used directly such that the device may be stopped if the alarm threshold is exceeded. In the case of an automotive vehicle, for example, the detection of an imminent failure of the timing belt of the engine by virtue of an instrumented tensioning device may trigger a visual alarm (signal lamp on the instrument panel) or sound alarm alerting the driver to a potential problem.

Figure 2:
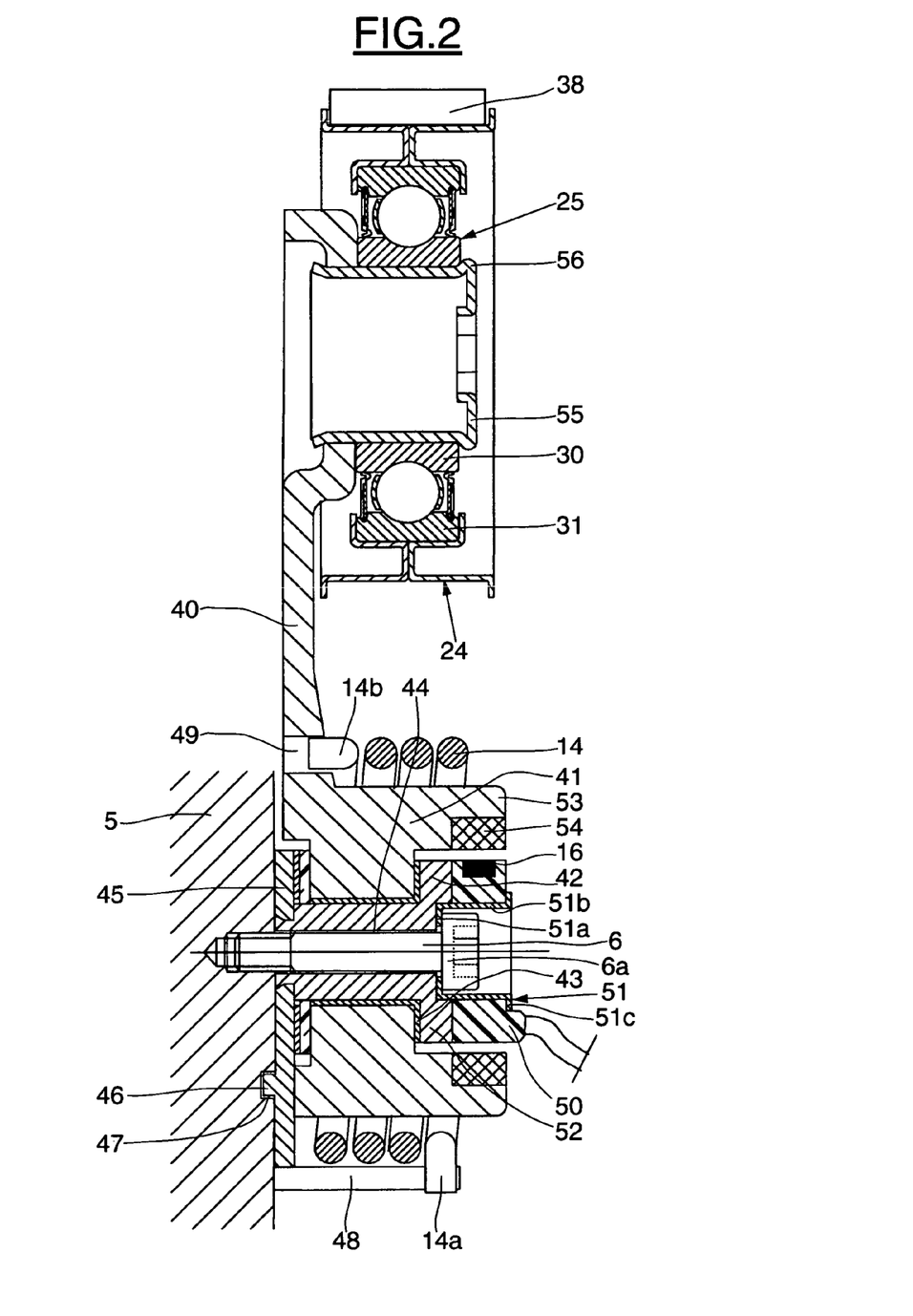
FIG. 2 illustrates a cross-sectional view of an embodiment of a tensioning device.

FIG. 2 depicts a cross-sectional view of an embodiment of a tensioning device. The tensioning device includes a swivel arm 40 with a pulley 24 at one end and a pivot bearing 41 at the other end. The pivot bearing 41 may be surrounded radially by a tension spring 14. The pivot or bearing hub 41 is rotation-mounted on a fixed inner part 42 of a collar 43 forming a plain bearing. The fixed inner part 42 may serve as an axis for the pivot or bearing hub 41. The fixed inner part 42 is fixed on the block 5 by a screw 6 passing through a bore 44 in the fixed inner part 42. The fixed inner part 42 rests on the block 5 by means of a plate 45. The plate 45 includes a stop pin 46 engaging in a notch 47 in the block 5 and a retaining lug 48 securing the first end 14a of the helical spring 14. The opposite end 14b of the helical spring 14 engages a hole 49 in the swivel arm 40. The helical spring 14 is pretensioned to exert a return torque which brings the pulley 24 back into contact with the belt 38.

A sensor block 50, in the form of a crown may be fixed on the free end of the fixed inner part 42 by a holding collar 51. The holding collar may include a radial portion 51a wedged between a radial end wall of the fixed inner part 42 and a head 6a of the screw 6. A tubular wall 51b extends axially on the side opposite to the fixed inner part 42. A radial wall 51c extends outward from the free end of the tubular wall 51b. The sensor block 50 is disposed on the outer surface of the axial wall 51b. The sensor block 50 is held between a radial shoulder 52 of the fixed inner part 42 and the radial wall 51c. A sensor 16 disposed in the sensor block 50 lies flush with the outer surface of the sensor 50. The pivot bearing 41 includes an end 53 radially surrounding the sensor block 50 and a coder ring 54 flush with its inner surface, facing the sensor 16.

The pulley 24 is rotation-mounted on the swivel arm by rolling bearing 25. the inner raceway 31 of rolling bearing 25 is fit onto a tubular sleeve 55, made of dished plate, connected to the end of the swivel arm 40 and deformed to form a radial flange 56 for axially holding the inner raceway 31 in axial bearing contact on the opposite side against the end of the swivel arm 40.

The tensioning device may be operated similar to the embodiment of a tensioning device illustrated by FIG. 1.

Figure 3:
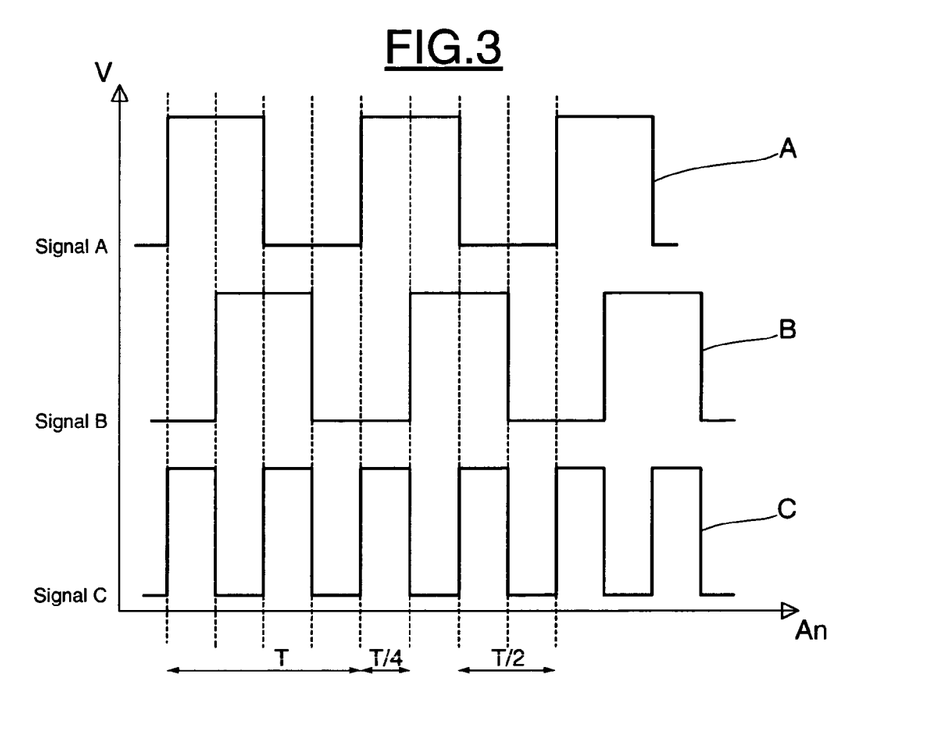
FIG. 3 illustrates a plot of signals measured by an embodiment of a sensor unit positioned on a tensioning device.

FIG. 3 depicts a representation of signals produced by an embodiment of sensors disposed on a tensioning device. The sensors may be circumferentially offset to provide a signal phase-shifted by half a period.

In FIG. 3, the angular velocity, An, is plotted on the x-axis and the tension, V, of the signal furnished by the sensors is plotted on the y-axis. In an embodiment, a first signal, A, is a square-pulse signal with a period, T, assuming the values zero or one. The signal, B, is a square-pulse signal similar to the signal A and offset by a quarter of a period T/4. From these two signals, a square-pulse signal C is derived. Signal C, at a given instant, has a value one if the signals A and B vary in value and zero if they are equal in value. A period of signal C equal to the period of the signal A or signal B divided by two, i.e. T/2, is obtained. A resultant signal of better resolution is thus obtained from signals furnished by each sensor.

The value of the period T is representative of the instantaneous angular velocity of the moving element relative to the fixed bracket. The angular displacement and hence the angular position of the moving element relative to the fixed bracket may be deduced from the signal C through the use of a pulse counter. In certain embodiments, the direction of rotation of the moving element relative to the fixed bracket may be deduced through the sign of the phase shift measured between the signals A and B.

Figure 4:
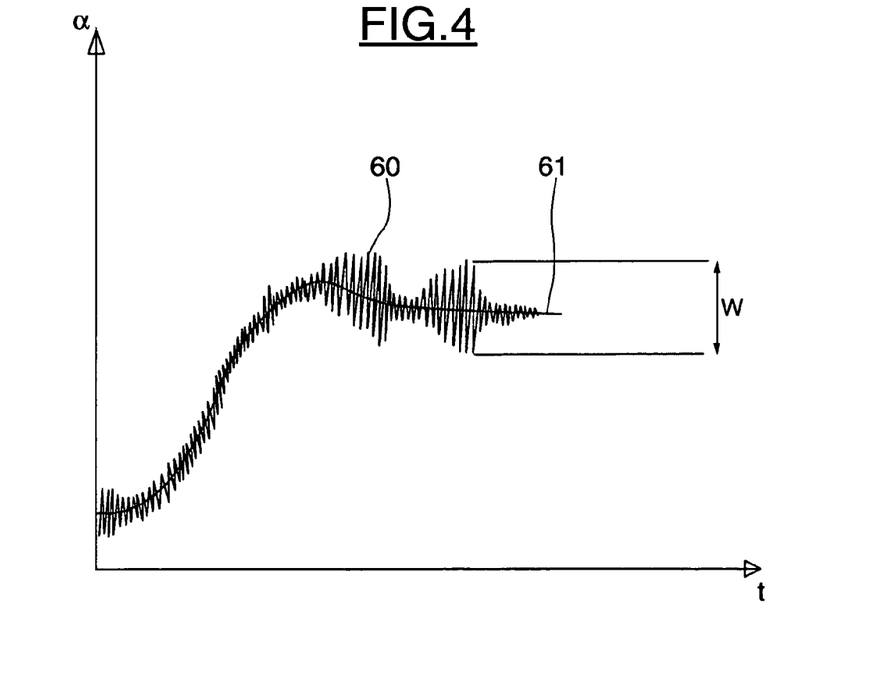
FIG. 4 illustrates an angle measurement determined by an embodiment of a sensor unit for rotation parameters positioned on a pivoting tensioning device.

FIG. 4 depicts a representation of a signal that may be derived from the measuring signals of the sensors 16. In FIG. 4, the time, t, is plotted on the x-axis and the value of angular displacement, α, between a working cam or a swivel arm and a fixed bracket is plotted on the y-axis. A first signal 60 is represented by a continuous uneven curve. The signal 60 oscillates about a mean signal 61 of so-called "mean" position embodied by a smooth curve. Instantaneously, the signal 60 oscillate about the mean signal 61 with an amplitude, W. Similarly, the signal 60 possess instantaneously a certain frequency of oscillation about the mean signal 61.

An angle of rotation, a mean angle of rotation, a rotation velocity, a frequency and an amplitude of oscillation may be obtained from the signals 60 and 61. By processing signal 60, it is possible to retrieve the frequencies and amplitudes of the multiple signals making up the signal 61 emanating from the sensor 16. By analyzing the progression of these parameters of movement between the moving element and the fixed bracket, it is possible to detect a possible failure, wear of the belt, or an impending tear.

Figure 5:
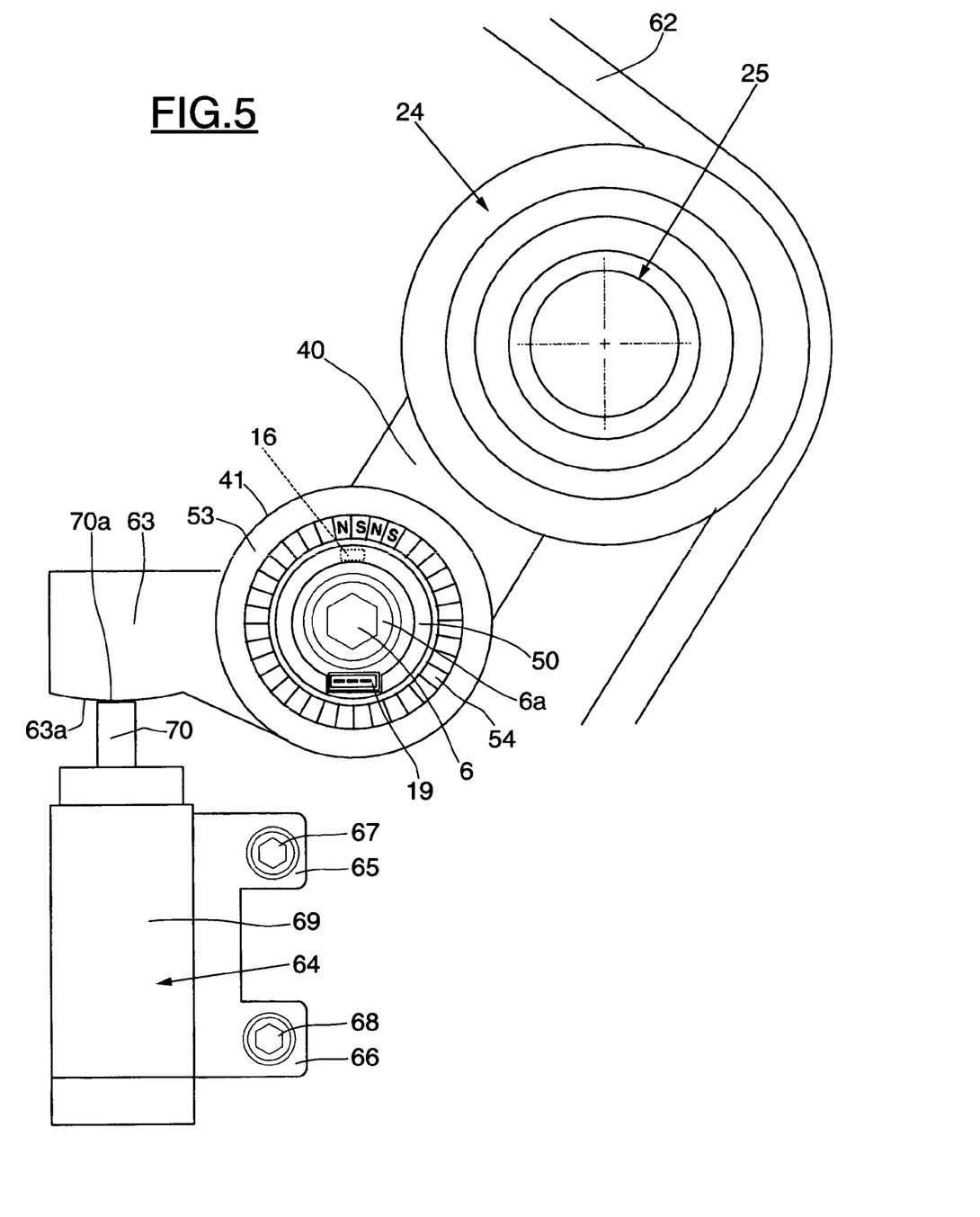
FIG. 5 illustrates a top view of an embodiment of a device.
Figures 6, 7:
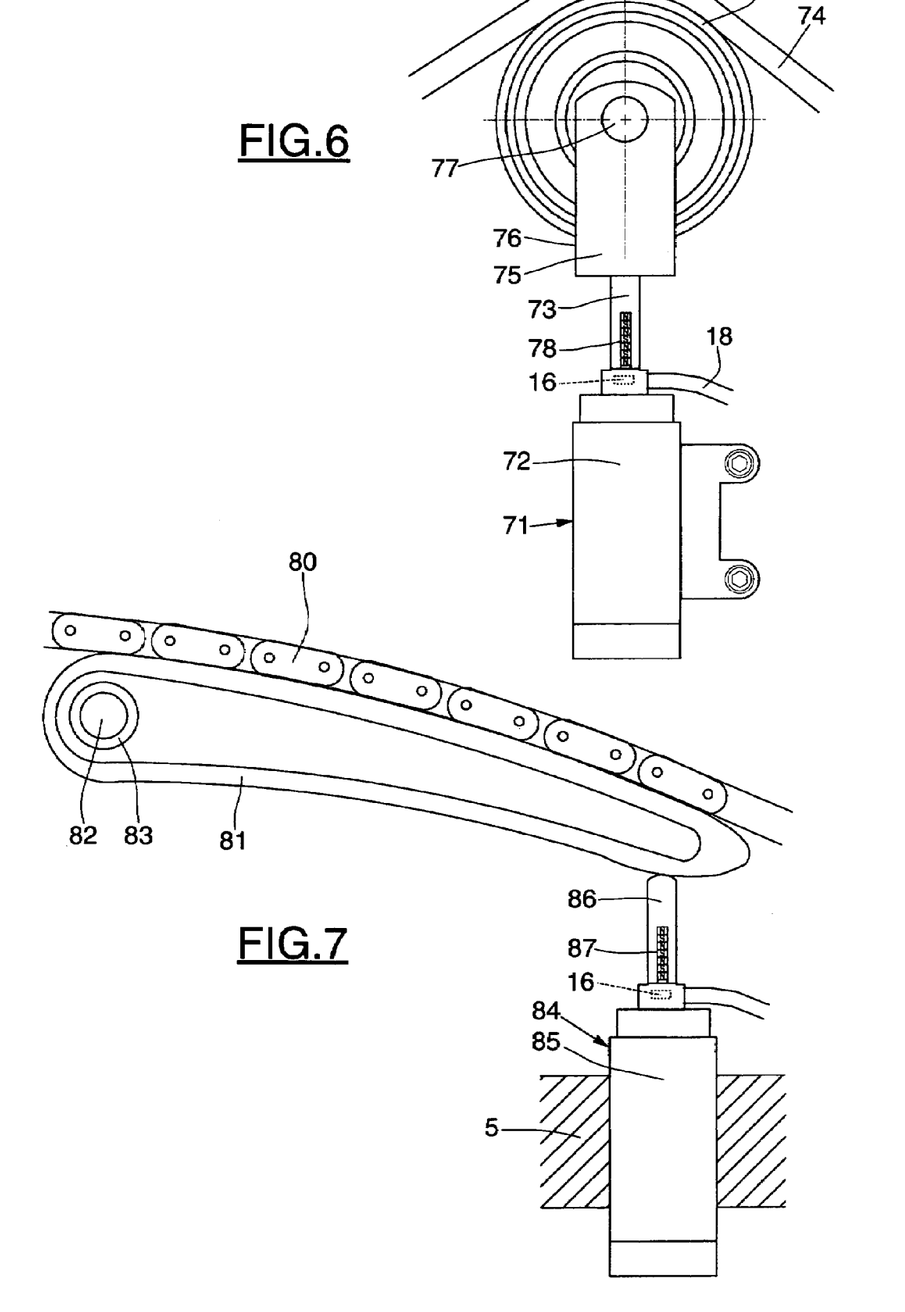
FIG. 6 illustrates a side view of an embodiment of a tensioning device.
FIG. 7 illustrates a side view of an embodiment of a tensioning device.

FIG. 5 illustrates a variant of an embodiment of a tensioning device according to FIG. 2. The pulley 24 is in contact with a belt 62, only one portion of which has been represented. The coder ring 54 may be a multipolar magnetic ring represented by a circumferential alternation of north pole and south pole. The sensor 16, represented by dotted lines, may be buried in the sensor block 50, fixed on the inner part 42 by screw 6. The screw head 6a is visible. The block 50 includes a three-pin plug 19, diametrically opposed to the sensor 16.

A supporting arm 63, joined to the pivot bearing 41, extends in radial projection. A hydraulic or pneumatic pusher 64, fixed on the block by fastening lugs 65, 66 and screws 67, 68, includes a body 69 and a push rod 70. The push rod 70 comes to bear on a corresponding contact surface 63a of the supporting arm 63. The rod 70 exerts a tension force upon the surface 63a, along an axis not passing through the rotation axis of the swivel arm 40 relative to the fixed inner part 42. The pusher 64 thus enable a force to be exerted which causes the rotation of the swivel arm 40 and may achieve suitable tension in the belt 62.

The contact surface 63a may have a matched profile that allows perpendicular contact with the end 70a of the rod 70. Allowing perpendicular contact may ensure appropriate transmission of the axial force such that the contact surface 63a can slide over the radial end 70a of the rod 70.

In some embodiments, an instrumented belt-tensioning device may processes the signals emanating from sensors for the parameters of movement of a moving element relative to a fixed bracket. Records of wear or imminent tearing of a belt may be detected. The records may also allow the tension of the belt to be adjusted initially or in the course of maintenance operations. Analyzing and processing the measuring signals may detect a failure of the actual tensioning device and even a failure of distant mechanical belt-driving elements. The instrumented tensioning device may continuously monitor the belt and its tension. The instrumented tensioning device may be simply constructed with low production costs.

In some embodiments, the system may include a microprocessor with a CPU and a memory. A memory may be coupled to the CPU. A memory may include executable program instructions, such as a computer program. A computer program include modules for implementing a process for monitoring the tension of a belt tensioned by means of a tensioning device. The tensioning device may include a fixed bracket, a moving element relative to the fixed bracket, and an actuator that may exert a permanent tension force between the moving element and the fixed bracket. The computer program may include a module for receiving signals corresponding to parameters of angular displacement of the moving element relative to the fixed bracket, and a module for processing received signals. The module for processing received signals may furnishing a belt-tension record or a failure record on the basis of a movement value, a movement velocity value, and a frequency and amplitude of oscillation value.

The invention claimed is:

1. A belt- or chain-tensioning device, comprising:
   a fixed bracket;
   a moving element relative to the fixed bracket comprising:
      a working cam comprising an inner surface and an outer surface, wherein the working cam is mounted to the fixed bracket such that the inner surface rotates on the fixed bracket; and
      a pulley rotatably-mounted on the outer surface of the working cam,
      wherein the pulley is configured to contact a belt or a chain;
   an actuator configured to exert a permanent tension force between the moving element and the fixed bracket;

a sensor unit configured to monitor parameters of angular displacement of the moving element relative to the fixed bracket, and a coder element positioned on the working cam, and configured to be able to rotate past a sensor positioned on the fixed bracket, wherein the fixed bracket comprises a base adapted to be fixed on a block and a tubular axial portion extending axially from the base towards the working cam and onto which is positioned the sensor, wherein the working cam comprises a radial wall extending radially outward from the outer surface and a tubular skirt extending axially from the radial wall, radially surrounding the free end of the axial portion of the fixed bracket, and comprising the coder element facing the sensor, wherein the actuator is disposed axially between the base of the fixed bracket and the radial wall of the working cam; and wherein the skirt forms with the axial portion an annular leak-tight passage to protect the coder element, the sensor, and the seat of the actuator from the intrusion of pollutant outer elements.

2. The device of claim 1, wherein the coder element comprises an optical coder ring, and wherein the optical coder ring comprises an alternation of reflective and opaque zones or a multipolar magnetic coder ring.

3. The device of claim 1, wherein the sensor unit measures angular displacement, a frequency and an angular displacement velocity of the moving element relative to the fixed bracket.

4. The device of claim 3, wherein the tensioning device further comprises a module for processing received signals configured to determine from a value of mean angular displacement.

5. The device of claim 4, wherein the tensioning device determines a failure of the belt or of the tension device on the basis of thresholds of mean linear displacement or on the basis of mean angular displacement.

6. The device of claim 4, wherein the tensioning device determines a record of failure of the belt or of the tension device on the basis of the frequency or amplitude of oscillation about a mean angular displacement value.

7. The device of claim 6, wherein the tensioning device determines a record of failure on the basis of thresholds of amplitude of oscillation or of frequency of oscillation about a mean angular displacement value.

* * * * *